(12) United States Patent
Hariharan et al.

(10) Patent No.: US 11,737,190 B2
(45) Date of Patent: Aug. 22, 2023

(54) TRANSIENT SUPPRESSION SYSTEMS AND METHODS IN ELECTRICAL CIRCUITS

(71) Applicant: Maxim Integrated Products, Inc., San Jose, CA (US)

(72) Inventors: Suresh Hariharan, Livermore, CA (US); Ron Vincent Ocampo, San Jose, CA (US); Ramesh Selvaraj, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/373,775

(22) Filed: Jul. 13, 2021

(65) Prior Publication Data

US 2022/0039236 A1 Feb. 3, 2022

Related U.S. Application Data

(60) Provisional application No. 63/057,825, filed on Jul. 28, 2020.

(51) Int. Cl.
*H05B 45/30* (2020.01)
*H05B 45/50* (2022.01)
*H05B 45/38* (2020.01)
*H05B 45/375* (2020.01)

(52) U.S. Cl.
CPC .......... *H05B 45/50* (2020.01); *H05B 45/375* (2020.01); *H05B 45/38* (2020.01)

(58) Field of Classification Search
CPC ...... H05B 45/37; H05B 45/39; H05B 45/375; H05B 45/395; H05B 45/3725
See application file for complete search history.

(56) References Cited

U.S. PATENT DOCUMENTS

| | | | |
|---|---|---|---|
| 9,763,296 B1 * | 9/2017 | Milanesi | H05B 45/44 |
| 10,411,600 B1 * | 9/2019 | Chai | H05B 45/395 |
| 10,582,579 B1 * | 3/2020 | Milanesi | H05B 45/3725 |
| 2014/0159598 A1 * | 6/2014 | Boezen | H05B 45/14 |
| | | | 315/307 |
| 2015/0256071 A1 * | 9/2015 | Penzo | H05B 45/48 |
| | | | 315/297 |
| 2018/0049283 A1 * | 2/2018 | Lee | H05B 45/3725 |
| 2018/0270923 A1 * | 9/2018 | Milanesi | H05B 45/3725 |
| 2019/0053341 A1 * | 2/2019 | Stoeger | H05B 45/10 |
| 2021/0100082 A1 * | 4/2021 | Aoki | H05B 45/305 |

* cited by examiner

*Primary Examiner* — Tung X Le
(74) *Attorney, Agent, or Firm* — North Weber & Baugh LLP; Michael North

(57) ABSTRACT

The present disclosure relates generally to systems and methods for transient response improvements in electrical circuits. More particularly, the present disclosure relates to systems and methods for suppressing overshoot currents and overshoot durations in circuits using switching regulators, such as driver circuits for LED applications. Embodiments of the invention relate to an LED driver that utilizes transient suppression systems and method for LED applications.

17 Claims, 7 Drawing Sheets

TRANSIENT SUPPRESSION SYSTEMS AND METHODS IN ELECTRICAL CIRCUITS

CROSS REFERENCE TO RELATED PATENT APPLICATIONS

This application is related to and claims the priority benefit, under 35 U.S.C. § 119(e), from U.S. Provisional Patent Application Ser. No. 63/057,825 entitled "TRANSIENT SUPPRESSION SYSTEMS AND METHODS IN ELECTRICAL CIRCUITS," filed on Jul. 28, 2020 and listing as inventors Suresh Hariharan, Ron Vincent Ocampo, and Ramesh Selvaraj. Each reference mentioned in this patent document is incorporated by reference herein in its entirety and for all purposes.

BACKGROUND

A. Technical Field

The present disclosure relates generally to systems and methods for transient response improvements in electrical circuits. More particularly, the present disclosure relates to systems and methods for suppressing overshoot currents and overshoot durations in circuits using switching regulators, such as driver circuits for LED applications.

B. Background

As headlamp manufacturers move towards combining single string high-beam low-beam and multistring configurations, they are faced with problems resulting from power converters transitioning from driving a relatively high number of active LEDs to a relatively lower number of LEDs. Generally, in these types of lighting applications, depending on the magnitude of change in load conditions, such transitions cause the voltage on the output capacitor of the power converter, such as those found in an H-bridge buck-boost light emitting diode (LED) driver, to exceed the voltage required to drive the new LED configuration. This, in turn, creates a relatively large overshoot in the LED current that may exhibit amplitudes and durations that under certain instances may cause permanent physical damage to LEDs.

Existing approaches for reducing current overshoot utilize methods that involve monitoring the output capacitor voltage or similar and waiting for the capacitor to discharge, e.g., from 40V to 18V through the regulator circuit, before operating a reduced number of active LEDs in the same or different LED string. However, the time delay caused by the waiting period, negatively impacts the duty cycle and causes unwanted losses in LED brightness, thus, requiring that the programmed LED current be increased in order to compensate for such losses. Some approaches utilize a microcontroller that communicates with a buck-boost controller via a feedback loop to monitor a target voltage to which the output capacitor must discharge. However, to account for variations in the overall circuit that may occur once the feedback loop takes back control of the LED current, such approaches require additional fine-tuning to counter unwanted oscillations in the circuit and directly programming the desired target voltage. This unnecessarily increases circuit complexity and limits circuit operation to a set of pre-programmed states dictated by the microcontroller.

Accordingly, what is needed are systems and methods that allow for safe and rapid discharging of the output capacitor when a change in load condition occurs to reduce or suppress both the magnitude and the duration of overshoot currents and similar transient effects.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
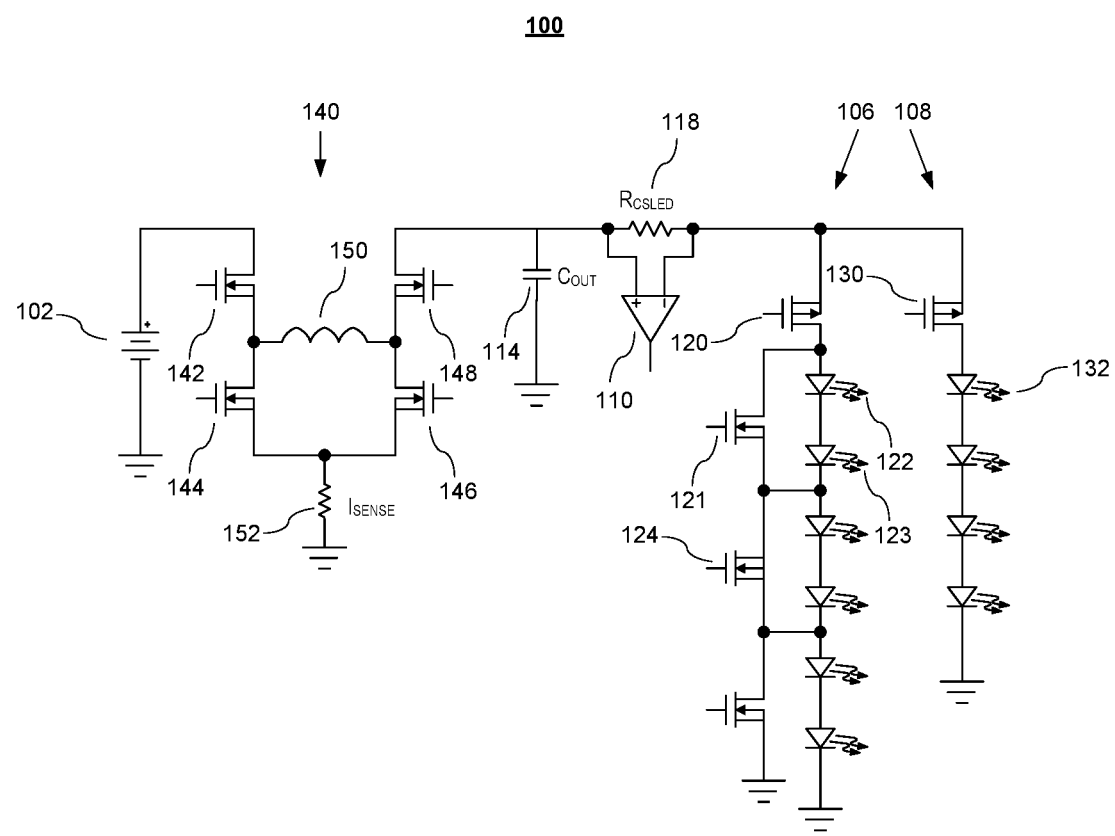
FIG. 1 is a partial schematic illustrating an LED driver circuit that utilizes transient suppression systems and methods according to various embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled"

shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

It shall be noted that embodiments described herein are discussed in the context of LED driver circuits, but one skilled in the art shall recognize that the teachings of the present disclosure are not limited to any specific driver circuit, voltage or current regulators, or LED applications and may equally be used in other contexts.

In this document the terms "brightness" and "luminance" are used interchangeably and refer to a measure of perceived surface brightness as measurable in $cd/m^2$. Similarly, the terms "regulator" and "converter," and the terms "LED string" and "LED array," are used interchangeably. "Control circuit" comprises microcontrollers, logic elements, and any other control elements recognized by one of skilled in the art.

FIG. 1 is a partial schematic illustrating an LED driver circuit that utilizes transient suppression systems and methods according to various embodiments of the present disclosure. LED driver circuit 100 in FIG. 1 comprises power source 102, current regulator 140, amplifier circuit 110, LED strings 106 and 108 that comprise respective switches 120 and 130, resistors 118, 152, and output capacitor 114. It is noted that for purposes of clarity, certain auxiliary circuit elements in FIG. 1 are not shown or shown only partially, such as a control circuit that controls current regulator 140 and switches, e.g., 120, 124. One skilled in the art will appreciate that any number of different or additionally circuit elements may be used to generate and process signals to control one or more circuit components, such as charge pumps, converters, microcontrollers, etc.

As depicted in FIG. 1, power source 102 is implemented as a battery, and current regulator 140 is implemented as an H-bridge buck-boost converter that comprises inductor 150, sense resistor 152, and n-type MOSFETs 142-148. However, this is not intended as a limitation on the scope of the present disclosure as any type of regulator or controller circuit may be used. In addition, while switches are shown as MOSFET devices, it is understood that any other type of switch (e.g., BJTs) may be used to accomplish the objectives of the present disclosure.

In embodiments, LED string 106 comprises and array of LEDs (e.g., 122) that may be activated and deactivated individually or in groups by switches (e.g., 124) to control the number of LEDs in a string (e.g., 106) that are turned on at any given time. In embodiments, string 106 may be used to operate, e.g., a nighttime, clearance, or parking light, and string 108 may operate a daytime running light in an automotive application. Amplifier circuit 110 may be implemented as a high-speed circuit that monitors the load current flowing through LED strings 106, 108, e.g., by detecting a voltage or current in resistor 118.

In operation, the LED driver may act as a current source that uses high-side current sense resistor 118 that is placed in series with string 106, 108 to directly or indirectly monitor a load current flowing through LED string 106, 108, e.g., by detecting a voltage or current in resistor 118. The load current information may be fed back, e.g., in the form of an output voltage of amplifier circuit 110. In embodiments, the load current information may be provided to an error amplifier (not shown in FIG. 1) as a feedback signal and used by a control circuit to adjust current regulator 140 to generate a substantially constant output current. As a person of skill in the art will appreciate, current regulator 140 may use the feedback signal to control the load current, e.g., by varying a duty cycle of switches 142-148.

Since the brightness of an LED is known to be substantially proportional to the average current flowing through it, in general, bypass switch 121 may be controlled or programmed to continuously turn on and off to cause LEDs 122-123 to have a desired brightness. In embodiments, a control circuit may adjust the string current using any known pulse width modulation (PWM) method, e.g., by varying a duty cycle of switch 121 by continuously turning it on and off. For example, switch 121 may be controlled to turn on 80% of the time, causing LEDs in string 106 to receive the load current 20% of the time, e.g., at a fixed switching frequency of 200 Hz. It is understood that, in embodiments, switch 121 may shunt LEDs 122-123 to bypass them altogether.

In scenarios when H-bridge buck-boost LED driver circuit 100 switches from driving string 106, which has a relatively higher number of LEDs than string 108, to driving string 108, the voltage to which output capacitor 114 has been charged to drive string 106 will exceed what is necessary to operate string 108. As previously mentioned, in existing designs, transitions that involve relatively large changes in load condition typically cause unwanted transient effects, such as an overshoot in LED current, as illustrated in FIG. 2.

Figure 2:
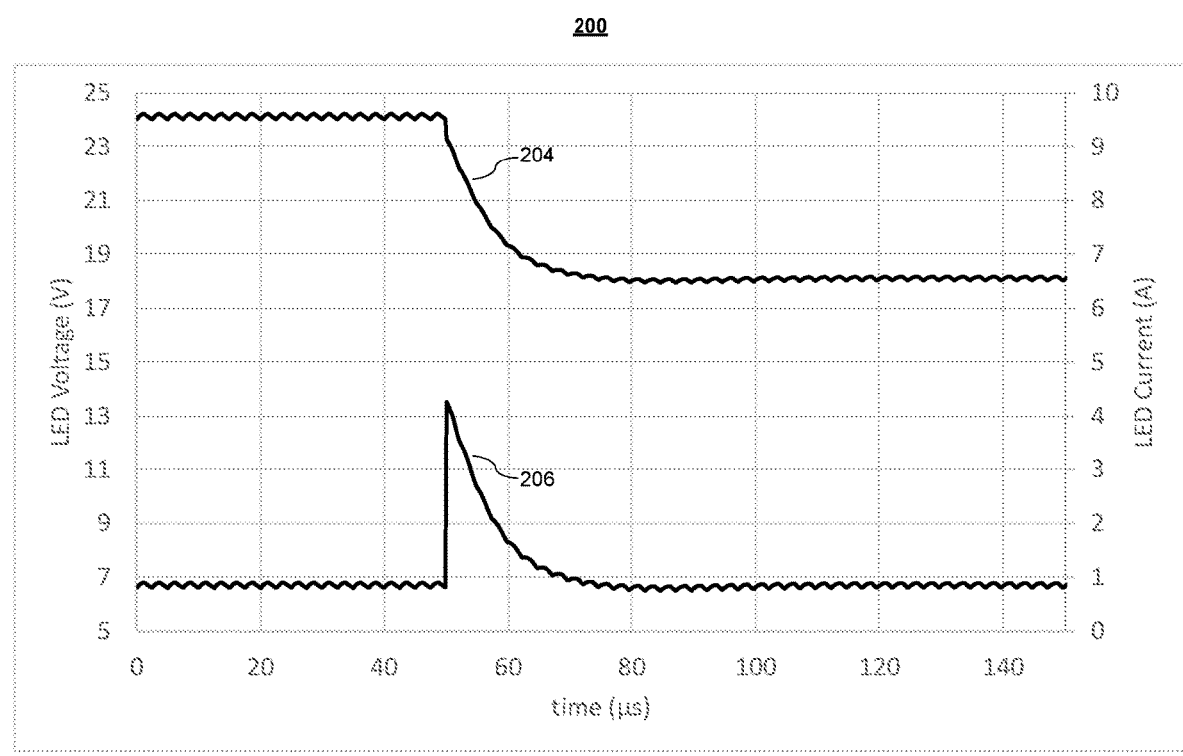
FIG. 2 illustrates a transient response in common LED driver circuits.

As depicted in FIG. 2, once LED voltage 204 starts dropping from about 24 V to 18 V as a result of the transition, LED current 206 rises from about 1 A to over 4 A before reaching its steady-state condition. Therefore, in various embodiments herein, an LED driver control circuit, such as that shown in FIG. 3, is used to suppress or cancel such transient effects, as discussed next.

Figure 3:
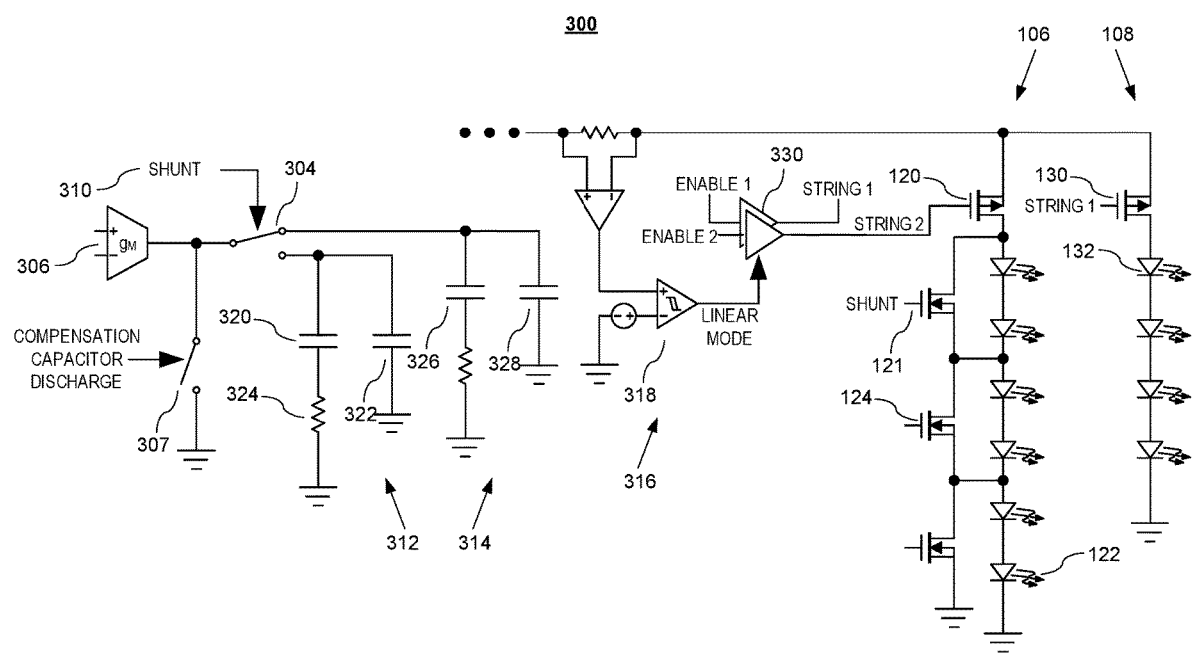
FIG. 3 is a partial schematic illustrating an LED driver control circuit for suppressing unwanted transients according to various embodiments of the present disclosure.

FIG. 3 is a partial schematic illustrating an LED driver control circuit for suppressing unwanted transients according to various embodiments of the present disclosure. Same numerals as in FIG. 1 denote similar elements. Control circuit 300 comprises input 310 (denoted as "shunt" input in FIG. 3), priority switch 304, error amplifier 306, discharge switch 307, compensation networks 312, 314, and mode selection circuit 316 that may comprise comparator 318 and PMOS gate driver 330. It is noted that although only two compensation networks 312, 314 are depicted in FIG. 3, this is not intended as a limitation since any number of compensation networks may be used to control any number of bypass switches.

In operation, priority switch 304 may be used to select which of compensation networks 312, 314 will be used to control the current regulator circuit that drives strings 106, 108. In embodiments, priority switch 304 may change its state depending on input signal 310 that may be externally supplied, e.g., in response to a user selection. Similarly, signal 310 may be a user-supplied signal that, for example, causes a number of LEDs to be reduced. As a result, the status of switch 121 may determine whether compensation network 312 or compensation network 314 will be active. As depicted in FIG. 3, compensation networks 312, 314 may be controlled within a control loop (not shown) and implemented as RC networks, which advantageously benefits circuit stability. In embodiments, input 310 may be combined with a signal that controls priority switch 304 to improve the circuit's transient response. In embodiments, compensation networks 312, 314 may be multiplexed, e.g., in scenarios when input 310 is high.

Special considerations may apply in scenarios where string 106 transitions to a lower number of LEDs but is not with priority switch 304. As discussed in greater detail with reference to FIG. 5, to keep the LED current from becoming unstable when transitioning to a low number of LEDs, in embodiments, additional logic may be used to determine two or more consecutive overshoot events or output capacitor discharge events and, in response, discharge a compensation capacitor (e.g., 320) in an active compensation network (e.g., 312) via discharge switch 307 to reduce or eliminate unwanted oscillations.

In a manner similar to FIG. 1, a typical load may comprise any number of LED arrays having different numbers of LEDs that present different load impedances to current regulator 140. As previously mentioned, when LED driver circuit 100 switches operation from string 106 to string 108 and vice versa, this may give rise to transient effects. Similarly, turning on and off a bypass switch (e.g., 124) may cause transient effects. In embodiments, such transient effects may be detected by high-speed amplifier circuit 110 that monitors the LED current via resistor 118, e.g., to determine an overshoot current.

In embodiments, in response to detecting such current overshoot, instead of operating PMOS dimming FET 120, 130 in FIG. 3 in a "fully on" mode, control circuit 300 may use mode selection circuit 316 to control FET 120 in a manner such as to operate in a linear regulating mode, e.g., to control the current flowing through FET 120 in a triode region. In embodiments, once an overshoot event has substantially ended, e.g., according to a threshold on the comparator indicative of an LED current on the comparator dropping below a predetermined threshold, the current regulator may resume regulating a programmed current, e.g., by deactivating linear mode in mode selection circuit 316. In this manner, the number of LEDs (e.g., 124) in a string may be changed and/or strings 106, 108 may be switched "on the fly" without requiring manual synchronization efforts, and the like. It is understood that any number of strings 106, 108 may operate in a timesharing fashion. For example, string 106 may operate at 10% duty cycle, while, at the same time, string 108 may operate at 90% duty cycle.

In detail, in embodiments, control circuit 300 may utilize compensation network 314, e.g., as a dedicated compensation network for controlling the duty cycle of the current regulator when switch 121 is on. A feedback loop (not shown) may be used to determine a compensation capacitor voltage for compensation capacitors 320, 322, e.g., during a first dimming cycle of compensation network 312 or when a number of LEDs in string 106 is reduced in a manner that causes the activation of switch 307. It is noted that capacitors 320, 322 in compensation network 312 may be equal and carry the same voltage, which, by virtue of being designed to drive different impedances, may be different from a voltage on capacitors 326, 328 in compensation network 314.

In embodiments, utilizing more than one compensation network 312, 314 and switching from an active compensation network to another, e.g., from 312 to 314, allows control circuit 300 to use one of compensation networks 312, 314 at a given time to hold the memory state of the control loop regulation point for the last active LED configuration associated with that particular compensation network. It is noted that storing a control capacitor voltage in a compensation network presumes that a subsequent use of the compensation network will involve driving the same load, i.e., number of LEDs in a given string, as in the previous state. Unlike for common compensation networks, using an additional compensation circuit for storing the memory state, advantageously, removes the need to actively discharge a compensation capacitor (e.g., 322) and reduces complexity in many scenarios while, at the same time, improving transient performance. Those skilled in the art will appreciate that compensation networks 312, 314 may be beneficially used in applications where one or more portions of an active string (e.g., 106) are intermittently shorted or dimmed.

In embodiments, to limit the LED current and, thus, unwanted overshoot, mode selection circuit 316 may be used to operate switch 120 in a linear regulator mode to regulate the LED current to a value that may be, e.g., 20%-40% higher than an operating point of the desired LED current determined by comparator 318. This advantageously prevents transient effects that may be caused by the main control loop, e.g., a 5%-10% overcurrent, from interfering with (and inadvertently triggering) the linear regulator mode.

In embodiments, in addition to operating switch 120 in linear regulator mode to limit the LED current, output capacitor 114 (shown in FIG. 1) may be discharged to reduce the stored energy and/or fluctuations in the voltage of output capacitor 114. Advantageously, discharging output capacitor 114 aids in reducing the time for operating switch 120 in linear regulator mode. In embodiments, discharging may be accomplished by using a control loop to regulate switches 142-148 in H-bridge 140 to turn on switches 144 and 148 to discharge output capacitor 114 and return an amount of energy proportional to the discharge back to battery 102 as indicated by negative inductor current 404 shown in FIG. 4.

Figure 4:
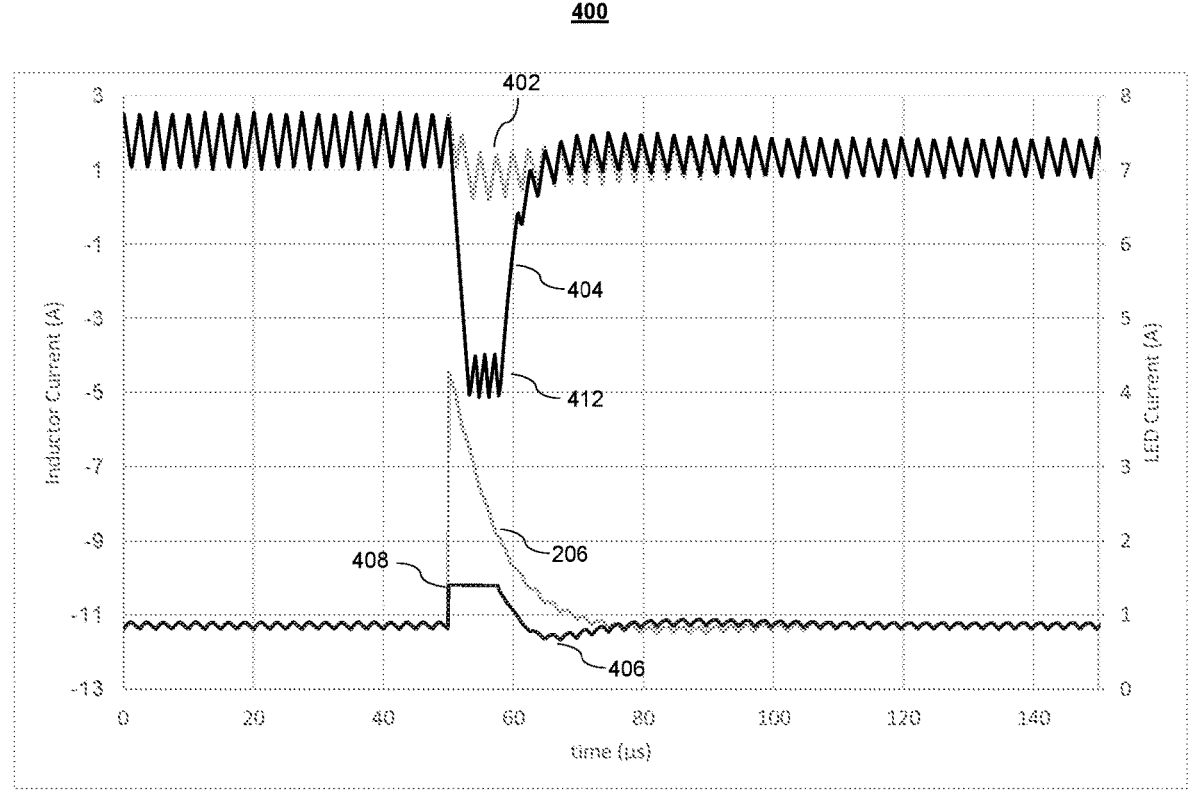
FIG. 4 illustrates the effect of transient cancellation as applied to an LED driver circuit according to various embodiments of the present disclosure.

In embodiments, an inductor current that flows through, e.g., switch 144 may be sensed by a sensing circuit that may comprise current sensing resistor 152. The inductor current may then be used to determine when to turn on and off switches 142-148 to discharge output capacitor 114 to return energy to battery 102, thereby, charging and discharging inductor 150. For example, to determine when to turn off switches 144 and 148 and turn off switches 142 and 146 and vice versa, two inductor current thresholds, e.g., −5 A and −4 A (as shown in FIG. 4) may be used to limit the inverse current to values that prevent inductor 150 from saturating. In embodiments, once the LED current through resistor 118 is sufficiently reduced, as may be indicated by amplifier circuit 110, discharging may be halted, and the regulator control loop may take over control of the LED current.

The LED driver control circuit illustrated in FIG. 3 is not limited to the constructional detail shown there or described in the accompanying text. As with FIG. 1, one skilled in the art will appreciate that any number of different or additionally circuit elements may be used to generate and process signals to control one or more circuit components, such as charge pumps, converters, microcontrollers, etc. A person of skilled in the art will further appreciate that capacitors may be implemented as banks of parallel variable capacitors that may be adjusted, for example, by control logic to predetermined capacitance values.

FIG. 4 illustrates the effect of transient cancellation as applied to an LED driver circuit according to various embodiments of the present disclosure. Depicted are repetitive inductor current 402 and LED current 206 for a common LED driver circuit, and inductor current 404 and LED current 406 for an LED driver circuit according to various embodiments of the present disclosure.

While, e.g., in response to a transition from a relatively high number of LEDs to a lower number of LEDs, LED current 206 in a common LED driver circuit rises from about 1 A to above 4 A, LED current 406 is clamped at about 1.4 A 408 following such a transition. In addition, the settling-time for the common LED driver circuit greatly exceeds that of the novel LED driver design that utilizes the discharge and current clamping methods described herein. Some embodiments reduce the duration of a current overshoot from about 50 μs to less than 10 μs. In other words, the time to reach steady-state is thus significantly reduced. As depicted in FIG. 4, discharging the output capacitor according to various embodiments causes inductor current 404 in the current regulator to reverse and flow back into the battery to charge it. In embodiments, toggling two sets of switches in the current regulator may cause the inductor current to toggle 412 between two thresholds, here, −5 A and −4 A, e.g., to limit the reverse current from saturating the inductor in the current regulator.

It shall be noted that experiments and results herein are provided by way of illustration and were performed under specific conditions using a specific embodiment or embodiments. Accordingly, neither these experiments nor their results shall be used to limit the scope of the disclosure of the current patent document.

Figure 5:
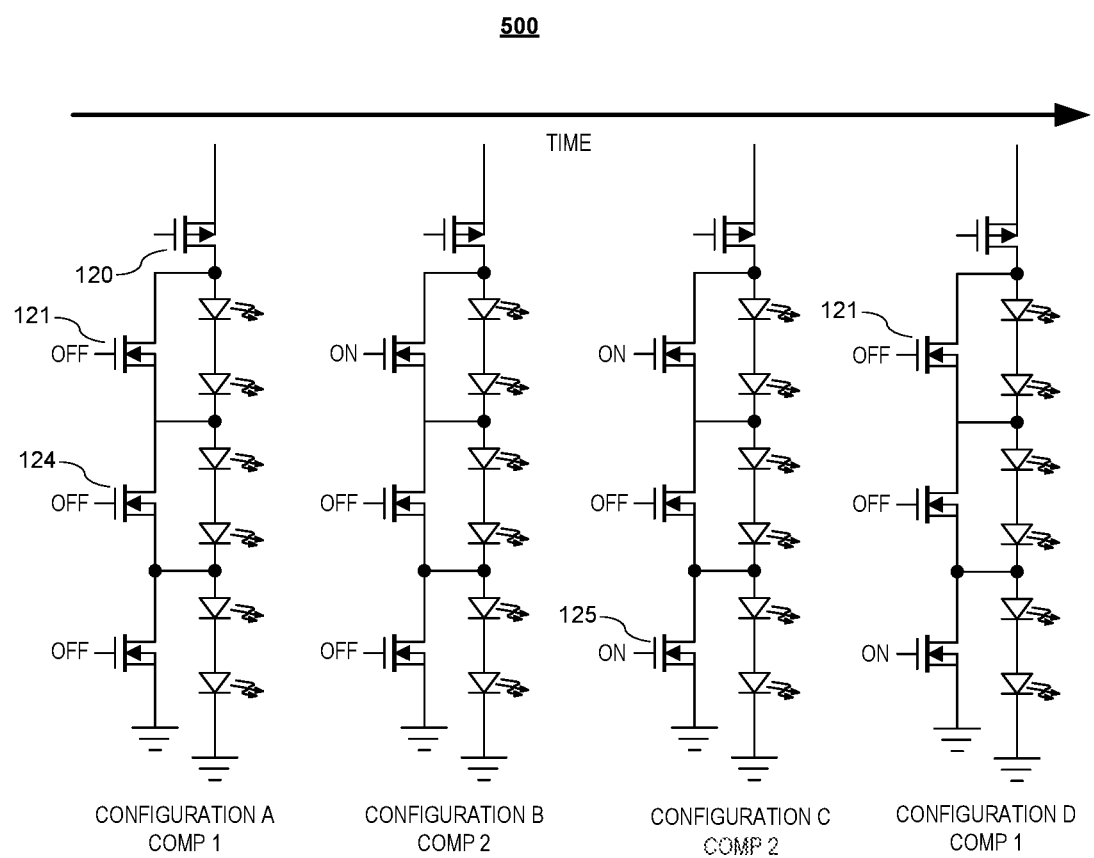
FIG. 5 depicts exemplary configurations to operate an LED string utilizing transient suppression systems and methods according to various embodiments of the present disclosure.

FIG. 5 depicts exemplary configurations to operate an LED string utilizing transient suppression systems and methods according to various embodiments of the present disclosure. Depicted are various changes in string configurations over time that each may be associated with a different load impedance, depending on the configuration of the LEDs. As previously mentioned with reference to FIG. 1, in automobile applications, one string may comprise LEDs that can operate, for example, high-beam lighting and low-beam lighting for nighttime driving. In embodiments, this may be accomplished by activating and deactivating bypass switch (e.g., 124) located at various locations along an array of LEDs.

In embodiments, bypass switch 121, which is controlled by an external signal that also controls priority switch 304, determines whether compensation network 1 or 2 (e.g., respective compensation networks 312 and 314 in FIG. 3) will be activated. For example, once switch 121 in LED configuration A that uses compensation network 1 (denoted as numeral 312 in FIG. 3) turns on to bypass the top two LEDs, the circuit assumes LED configuration B and transitions to use compensation network 2 (denoted as numeral 314 in FIG. 3) to account for reduced number of active LEDs in the string, while a compensation capacitor compensation network 1 may retain its charge, thereby, storing its control voltage value for future use. In embodiments, further reducing the number of LEDs by activating transistor 125 in FIG. 5, does not cause LED configuration C to transition away from compensation network 2. In configuration D where the number of LEDs is increased again, by virtue of turning off switch 121, the circuit transitions to back from compensation network 2 to compensation network 1.

It is noted that since the control voltage value that has been stored for compensation network 1 in configuration A, where all LEDs were active, may be too high for configuration D, where less than all LEDs are active. As a result, even if LED configurations A and D may use the same compensation network 1, the control voltage value that has been stored for compensation network 1 in configuration A may be too high for operating the LEDs in configuration D. Therefore, in embodiments, the voltage on a compensation pin in compensation network 1 may be reduced, e.g., by discharging compensation capacitors through switch 307.

In this manner, combined with systems and methods for suppressing unwanted transients described with reference to FIG. 1 through FIG. 4, transitioning from LED configuration A through LED configuration D shown in FIG. 5 will alleviate the problem of waiting times imposed by overshoot conditions when operating single or multi-string LED arrays in automotive and other applications.

Figure 6:
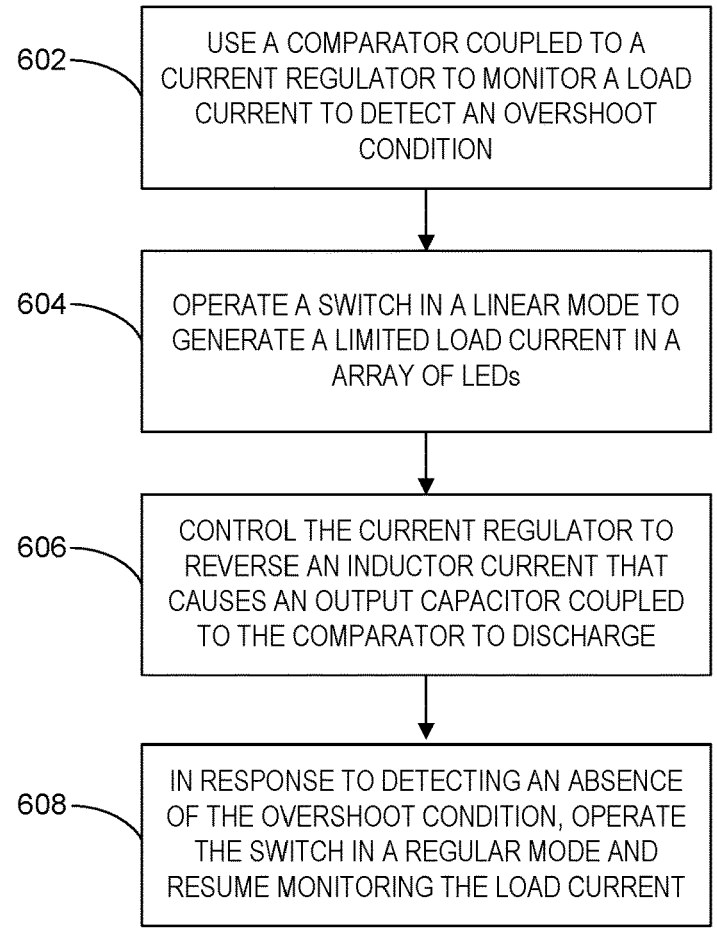
FIG. 6 is a flowchart of an illustrative process for suppressing unwanted transients accordance with various embodiments of the present disclosure.

FIG. 6 is a flowchart of an illustrative process for suppressing unwanted transients accordance with various embodiments of the present disclosure. Process 600 for suppressing unwanted transients may begin at step 602 when a comparator that may be coupled to a current regulator is used to monitor a load current to detect an overshoot condition, such as an overcurrent condition.

At step 604, a switch, e.g., a p-type MOSFET, may be operated in a linear mode such as to limit a load current in an array of LEDs.

At step 606, in response to sensing the load current, the current regulator may be controlled to reverse an inductor current in the current regulator, such that the inductor current causes an output capacitor that is coupled to the comparator to discharge. In embodiments, discharging the output capacitor comprises using a control loop that turn on and off switches in the current regulator in a manner such as to move charge from the output capacitor to a source. In embodiments, the inductor current may charge and discharge a current regulator inductor, e.g., according to a switching pattern that may be controlled based on a sensed inductor current.

Finally, at step 608 e.g., in response to detecting an absence of the overshoot condition, the switch may be operated in a regular mode and monitoring the load current may resume. One skilled in the art shall recognize that: (1) certain steps may optionally be performed; (2) steps may not be limited to the specific order set forth herein; (3) certain steps may be performed in different orders; and (4) certain steps may be done concurrently.

Figure 7:
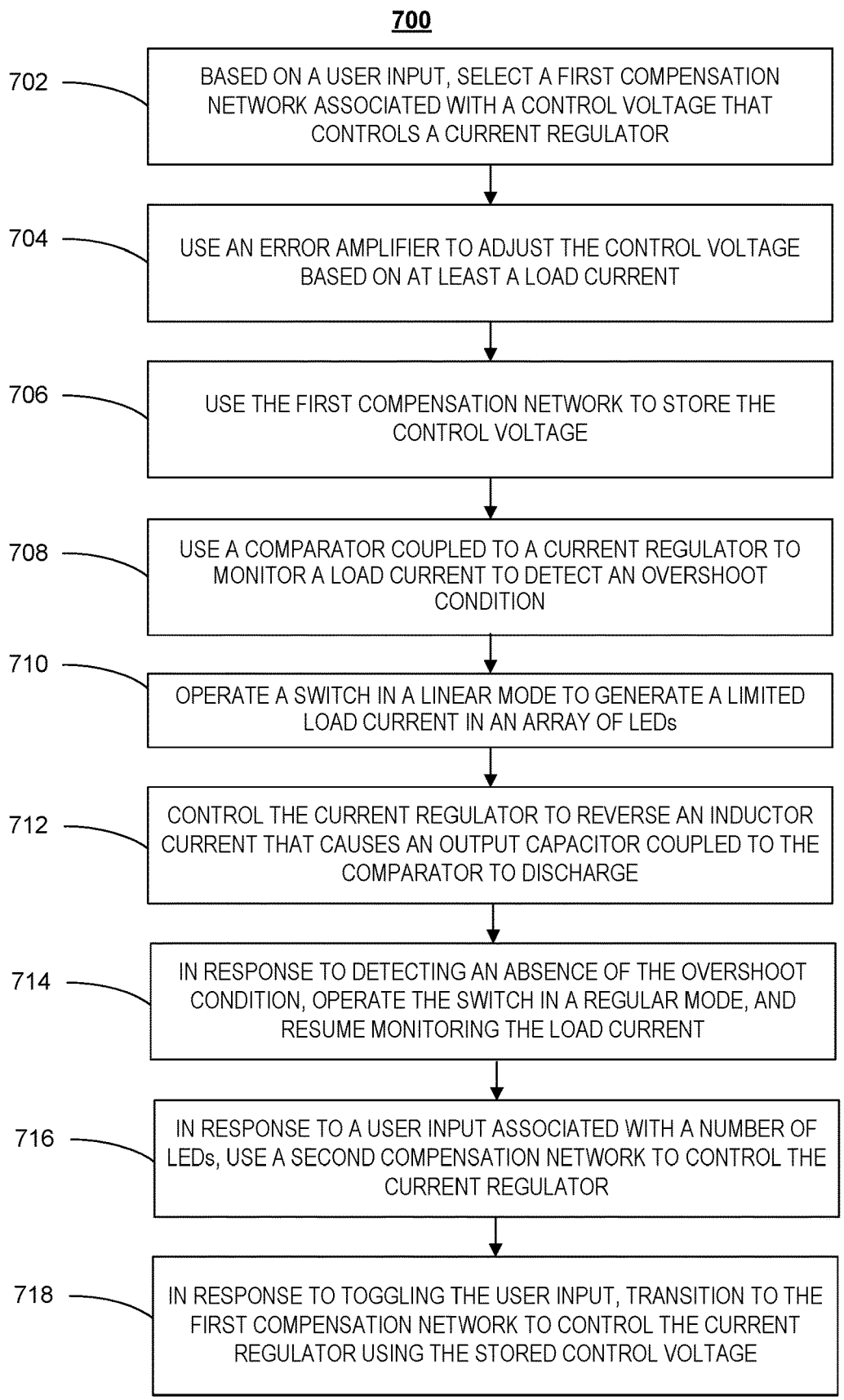
FIG. 7 is a flowchart of an alternative process for suppressing unwanted transients accordance with various embodiments of the present disclosure.

FIG. 7 is a flowchart of an alternative process for suppressing unwanted transients accordance with various embodiments of the present disclosure. Process 700 for suppressing transients may begin at step 702 when a first compensation network associated with a control voltage that controls a current regulator may be selected, e.g., based on a user input.

At step, 704 an error amplifier may be used to adjust a control voltage for the first compensation network, e.g., based on a monitored load current. In embodiments, the control voltage is associated with an array of LEDs, and the first compensation network may be used to control a duty cycle of the current regulator.

At step 706, the first compensation network may be used to store the control voltage for future use, e.g., on one or more capacitors.

At step 708, a comparator coupled to the current regulator may be used to monitor a load current to detect an overshoot condition, e.g., an overcurrent.

At step 710, a switch may be operated in a linear mode such as to limit a load current in the array of LEDs.

At step 712, in response to sensing the load current, the current regulator may be controlled to reverse an inductor current that causes an output capacitor to discharge into a battery.

At step 714, in response to detecting an absence of the overshoot condition, the switch may be operated in a regular mode, and monitoring the load current may resume.

At step 716, a second compensation network may be used to control the current regulator in response to a user input that may be associated with a number of LEDs in the array of LEDs.

Finally, at step 718, toggling the user input may trigger transitioning from the second compensation network back to the first compensation network to control the current regulator using the control voltage that has been stored on the first compensation network at step 706. In embodiments, in scenarios where the stored control voltage in the first compensation network is too high, for example, because an LED configuration has a number of LEDs that is significantly lower than a previous LED configuration, a compensation capacitor in the first compensation network may be discharged to adjust the stored control voltage to a more suitable value to accommodate the lower number of LEDs.

One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for controlling a light-emitting diode (LED) driver circuit to improve transient performance, the method comprising:
   using a comparator coupled to a current regulator to monitor a load current to detect an overshoot condition, the current regulator uses a first control voltage to generate an output voltage;
   using a first compensation network to store the first control voltage;
   in response to a user input, transitioning from the first compensation network to a second compensation network that stores a second control voltage;
   operating a switch in a mode configured to limit the load current in a first array of LEDs; and
   in response to detecting an absence of the overshoot condition, operating the switch in a regular mode.

2. The method of claim 1, further comprising using an error amplifier to adjust the first control voltage based on at least the load current.

3. The method of claim 1, further comprising, in response to the user input, transitioning from the second compensation network to the first compensation network to control the current regulator using the first control voltage.

4. The method of claim 3, wherein the first compensation network comprises a compensation capacitor that, after transitioning from the second compensation network to the first compensation network, is discharged to reduce the first control voltage.

5. The method of claim 4, wherein the second compensation network comprises a compensation capacitor that is not discharged when transitioning between compensation networks.

6. The method of claim 1, wherein operating the switch in the mode configured to limit the load current comprises operating the switch in a linear region.

7. The method of claim 1, sensing a current in the current regulator and, in response, switching between two sets of regulator switches in the current regulator to discharge the output capacitor.

8. The method of claim 1, wherein the comparator monitors the load current by sensing a voltage at a resistor that is coupled in a series configuration with the load.

9. The method of claim 1, wherein the reserved inductor current is generated by transferring at least some charge from the output capacitor to a battery that is coupled to the current regulator.

10. The method of claim 1, wherein the driver circuit is an LED driver circuit that comprises an H-bridge buck-boost converter.

11. The method of claim 1, wherein the driver circuit does not actively control the output capacitor to according to a target voltage.

12. A driver circuit for controlling a load current, the driver circuit comprising:
   a current regulator comprising an output capacitor and two sets of regulator switches, the current regulator uses a first control voltage to generate output voltage;
   a comparator circuit coupled to the current regulator to detect an overshoot condition in a load current;
   a switch coupled to the comparator circuit to generate, in response to the comparator circuit detecting the overshoot condition, a limited load current by operating the switch in a current limit mode to control at least some of the load current in first array of LEDs;
   a controller coupled to the current regulator, the controller toggles between the two sets of regulator switches to discharge the output capacitor in the presence of the overshoot condition;
   a first compensation circuit that stores the first control voltage; and
   a second compensation circuit that stores a second control voltage, the first and second compensation circuits being controlled based on user input.

13. The driver circuit of claim 12, wherein operating the switch in the current limit mode comprises operating the switch in a linear region.

14. The driver circuit of claim 12, wherein discharging the output capacitor reduces a waiting period for operating the switch in on the current limit mode.

15. The driver circuit of claim 12, wherein at least one of the first and second compensation circuits comprises a compensation capacitor that does need to be discharged.

16. The driver circuit of claim 12, wherein the switch comprises a MOSFET device.

17. The driver circuit of claim 12, wherein the overshoot condition is indicative of a load impedance change.

\* \* \* \* \*